United States Patent
Tiirola et al.

(10) Patent No.: US 12,537,621 B2
(45) Date of Patent: Jan. 27, 2026

(54) CORESET PUNCTURING DETERMINATION

(71) Applicant: NOKIA TECHNOLOGIES OY, Espoo (FI)

(72) Inventors: Esa Tapani Tiirola, Oulu (FI); Kari Juhani Hooli, Oulu (FI); Klaus Hugl, Vienna (AT); Timo Erkki Lunttila, Espoo (FI); Sami-Jukka Hakola, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/923,328

(22) Filed: Oct. 22, 2024

(65) Prior Publication Data

US 2025/0055597 A1    Feb. 13, 2025

Related U.S. Application Data

(63) Continuation of application No. PCT/EP2024/069648, filed on Jul. 11, 2024.
(Continued)

(51) Int. Cl.
*H04L 1/00* (2006.01)
*H04L 5/00* (2006.01)
(Continued)

(52) U.S. Cl.
CPC ............ *H04L 1/0069* (2013.01); *H04L 5/00* (2013.01); *H04W 56/0015* (2013.01); *H04W 72/0453* (2013.01); *H04W 72/231* (2023.01)

(58) Field of Classification Search
CPC .... H04L 1/0069; H04L 5/00; H04W 56/0015; H04W 72/0453; H04W 72/231
See application file for complete search history.

(56) References Cited

U.S. PATENT DOCUMENTS

2012/0008574 A1* 1/2012 Xiao ............... H04W 72/23 455/418
2021/0328700 A1* 10/2021 Hu ................. H04W 72/23
(Continued)

FOREIGN PATENT DOCUMENTS

WO    2023/041172 A1    3/2023
WO    WO-2025007741 A1 *    1/2025    ........... H04L 5/0053

OTHER PUBLICATIONS

English translation of WO-2025007741-A1, retrieved from PE2E Search on Jul. 14, 2025 (Year: 2025).*
(Continued)

*Primary Examiner* — Omar J Ghowrwal
(74) *Attorney, Agent, or Firm* — SQUIRE PATTON BOGGS (US) LLP

(57) ABSTRACT

Embodiments of the present disclosure relate to controlling a control resource set (CORESET) #0 puncturing. Some embodiments comprise determining, at a first apparatus, based at least on detection of a synchronization signal block, received from a second apparatus, on a specific frequency location, whether a CORESET of a specific type is punctured, wherein a portion of resources punctured in the CORESET of the specific type are incapable of carrying downlink control information; in accordance with a determination that the CORESET of the specific type is punctured, obtaining a CORESET puncturing pattern; and determining the portion of resources punctured in the CORESET at least based on the CORESET puncturing pattern. Furthermore, the method comprises indicating, from a second apparatus to a first apparatus, that a CORESET of a specific type is punctured by transmitting a synchronization signal block on a specific frequency location.

18 Claims, 10 Drawing Sheets

Related U.S. Application Data

(60) Provisional application No. 63/518,380, filed on Aug. 9, 2023.

(51) Int. Cl.
*H04W 56/00* (2009.01)
*H04W 72/0453* (2023.01)
*H04W 72/231* (2023.01)

(56) References Cited

U.S. PATENT DOCUMENTS

2022/0240249 A1* 7/2022 Liu ................... H04W 56/001
2023/0007626 A1* 1/2023 Tiirola ................ H04L 5/0053

OTHER PUBLICATIONS

English translation of CN 202310813502.5, Jul. 4, 2023, retreived from STIC on Jul. 14, 2025. (Year: 2023).*
International Search Report and Written Opinion dated Nov. 13, 2024, corresponding to International Patent Application No. PCT/EP2024/069648.
Timo Lunttila et al., "NR support for below 5 MHz BW", 3GPP Draft; R1-2301096, 3GPP TSG RAN WG1 #112 ; Feb. 27-Mar. 3, 2023, XP052248235.
Timo Lunttila et al., "NR support for below 5 MHz BW", 3GPP Draft; R1-2305026, 3GPP TSG RAN WG1 #113, May 22-May 26, 2023, XP052310472.

* cited by examiner

CORESET PUNCTURING DETERMINATION

CROSS-REFERENCE TO RELATED APPLICATION

This application is a Continuation of International Patent Application No. PCT/EP2024/069648, filed Jul. 11, 2024, which claims priority from U.S. Provisional Application No. 63/518,380, filed Aug. 9, 2023, the contents of each of which is hereby incorporated by reference in their entirety.

FIELDS

Various example embodiments of the present disclosure generally relate to the field of telecommunication and in particular, to methods, devices, apparatuses and computer readable storage medium for controlling a control resource set (CORESET) #0 puncturing, especially in the scenario of 5 MHz channel bandwidth and 20 resource blocks (RBs).

BACKGROUND

In release 18, a work item on new radio (NR) support for dedicated spectrum less than 5 MHz for frequency range 1 (FR1) has been approved. This work item relates to specialized networks, which are used to provide mission critical communications for industry verticals such as smart energy and infrastructure, public safety, and railway communications and also to 3 MHz CBW for any scenarios. These networks would benefit not only from the high spectral efficiency of 5G NR, but also from its other features like ultra-reliability and low latency.

SUMMARY

In a first aspect of the present disclosure, there is provided a first apparatus. The first apparatus comprises at least one processor; and at least one memory storing instructions that, when executed by the at least one processor, cause the first apparatus at least to: determine, based at least on a detection of a synchronization signal block, received from a second apparatus, on a specific frequency location, whether a CORESET of a specific type is punctured, wherein a portion of resources punctured in the CORESET of the specific type are incapable of carrying downlink control information; in accordance with a determination that the CORESET of the specific type is punctured, obtain a CORESET puncturing pattern; and determine the portion of resources punctured in the CORESET at least based on the CORESET puncturing pattern.

In a second aspect of the present disclosure, there is provided a second apparatus. The second apparatus comprises at least one processor; and at least one memory storing instructions that, when executed by the at least one processor, cause the second apparatus at least to: indicate, to a first apparatus, that a CORESET of a specific type is punctured by transmitting a synchronization signal block on a specific frequency location; and transmit, to the first apparatus, downlink control information at least based on a portion of resources of the CORESET which is not punctured.

In a third aspect of the present disclosure, there is provided a method. The method comprises: determining, based at least on a detection of a synchronization signal block, received from a second apparatus, on a specific frequency location, whether a CORESET of a specific type is punctured, wherein a portion of resources punctured in the CORESET of the specific type are incapable of carrying downlink control information; in accordance with a determination that the CORESET of the specific type is punctured, obtaining a CORESET puncturing pattern; and determining the portion of resources punctured in the CORESET at least based on the CORESET puncturing pattern.

In a fourth aspect of the present disclosure, there is provided a method. The method comprises: indicating, to a first apparatus, that a CORESET of a specific type is punctured by transmitting a synchronization signal block on a specific frequency location; and transmitting, to the first apparatus, downlink control information at least based on a portion of resources of the CORESET which is not punctured.

In a fifth aspect of the present disclosure, there is provided a first apparatus. The first apparatus comprises means for determining, based at least on a detection of a synchronization signal block, received from a second apparatus, on a specific frequency location, whether a CORESET of a specific type is punctured, wherein a portion of resources punctured in the CORESET of the specific type are incapable of carrying downlink control information; means for, in accordance with a determination that the CORESET of the specific type is punctured, obtaining a CORESET puncturing pattern; and means for determining the portion of resources punctured in the CORESET at least based on the CORESET puncturing pattern.

In a sixth aspect of the present disclosure, there is provided a second apparatus. The second apparatus comprises means for indicating, to a first apparatus, that a CORESET of a specific type is punctured by transmitting a synchronization signal block on a specific frequency location; and means for transmitting, to the first apparatus, downlink control information at least based on a portion of resources of the CORESET which is not punctured.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
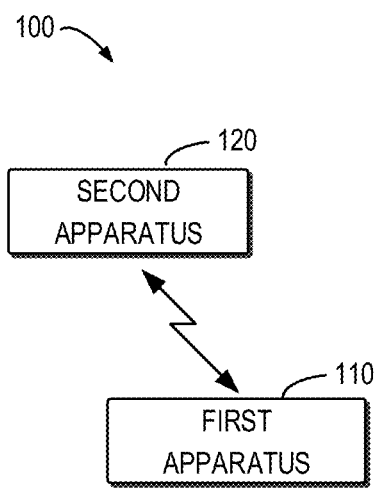
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the 5G-Advanced, the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains. In some embodiments, frequency domain resources may cover one or more resource blocks, each having 12 subcarriers and time domain resource resources may cover one or more OFDM symbols.

FIG. 1 shows an example communication network 100 in which embodiments of the present disclosure may be implemented. As shown in FIG. 1, the communication network 100 may include a first apparatus 110. Hereinafter the first apparatus 110 may also be referred to as a UE or a terminal device.

The communication network 100 may further include a second apparatus 120. Hereinafter the second apparatus 120 may also be referred to as a gNB or a network device. The first apparatus 110 may communicate with the second apparatus 120.

It is to be understood that the number of network devices and terminal devices shown in FIG. 1 is given for the purpose of illustration without suggesting any limitations. The communication network 100 may include any suitable number of network devices and terminal devices.

In some example embodiments, links from the second apparatus 120 to the first apparatus 110 may be referred to as a downlink (DL), while links from the first apparatus 110 to the second apparatus 120 may be referred to as an uplink (UL). In DL, the second apparatus 120 is a transmitting (TX) device (or a transmitter) and the first apparatus 110 is a receiving (RX) device (or receiver). In UL, the first apparatus 110 is a TX device (or transmitter) and the second apparatus 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

As described above, a study of NR support for dedicated spectrum less than 5 MHz for frequency range 1 (FR1) has been discussed.

For example, the following objectives shall be included for dedicated FDD spectrum in FR1:
  Identify and specify necessary changes to NR physical layer with minimum specification impact to operate in spectrum allocations from approximately 3 MHz up to below 5 MHz:
    Restrict to subcarrier spacing (SCS) of 15 kHz and the use of normal cyclic prefix.
    For synchronization signal/physical broadcast channel block (SSB):
      Reuse PSS/SSS specification without puncturing.
      PBCH based on current design.
    Identify and specify necessary minimum changes to physical downlink control channel (PDCCH), channel state information-reference signal (CSI-RS)/Tracking Reference Signal (TRS), physical uplink control channel (PUCCH), and physical random access channel (PRACH) for functional support based on existing design, without optimization.
Furthermore, some related aspects are listed as below:
For the 3 MHz channel bandwidth in band n100 (i.e., Frequency band for Future Railway Mobile Communication System (FRMCS)) (max channel utilization 15 physical resource blocks (PRBs) as already agreed in RAN1/RAN4):

physical broadcast channel (PBCH) transmission bandwidth is 12 PRBs.
CORESET #0 transmission bandwidth is to be decided by RAN1.
RAN1 is requested to consider whether the above also applies for other bands with 3 MHz channel bandwidth, or whether the PBCH transmission bandwidth is 15 PRBs for such bands.

For the 5 MHz channel bandwidth:
PBCH transmission bandwidth is 20 PRBs.
CORESET #0 transmission bandwidth is to be decided by RAN1.
Other details (including sync raster details) are to be progressed in the work groups.

Based on the current agreement, for 3 MHz channel bandwidth, the 12 & 15 PRB CORESET operation is supported. specifically, For 3 MHz channel bandwidth in all bands (max channel utilization 15 PRBs as already agreed in RAN1/RAN4):
PBCH transmission bandwidth is 12 PRBs.
For CORESET #0 transmission bandwidth, both 12 PRBs and 15 PRBs are supported.
In Case of 12 PRBs, the legacy interleaved (R=2) CORESET CCE-to-REG mapping is used with $N_{RB}^{CORESET}=12$, i.e., 12PRBs are indicated without puncturing.
In Case of 15 PRBs, the $N_{RB}^{CORESET}=24$ CORESET #0 is punctured.
Both interleaved (legacy interleaver size of R=2) and non-interleaved mapping are supported,
Some entries in the table are related with interleaved mapping and some are non-interleaved mapping.
A single table of up to 16 entries to accommodate both cases:
Maximum number of CORESET #0 symbols is 3.
Minimum number of CORESET #0 symbols is 2.
SSB and CORESET #0 multiplexing pattern 1 is used (pattern 1 means that SSB and CORESET #0 are time multiplexed")
REG bundle size=6.

As described above, i.e., one of the objectives of the work item may be "identify and specify necessary minimum changes to PDCCH for functional support based on existing design, without optimization. During system information acquisition, UE monitors PDCCH on resources spanning at least 4.32 MHz (i.e., 24 RBs), i.e., exceeding the targeted transmission bandwidths of 20, 15 and 12 RBs. The PDCCH changes that are necessary to support NR in narrow spectrum allocations should therefore be focused on these PDCCH resources. Another PDCCH aspect requiring attention is the PDCCH frequency domain location with respect to SSB.

The PDCCH can be mapped to sets of physical resources known as CORESETs, which in turn is comprised of control channel elements (CCEs). A control-channel element consists of 6 resource-element groups (REGs) where a resource-element group equals one resource block during one OFDM symbol.

CORESETs can be flexibly configured to the UE after the initial access. However, there are limited configuration options available for the CORESET #0 that are used e.g., for the PDCCH that schedules the transmission of System Information Block 1 (SIB1), known as Type0-PDCCH.

Figure 2:
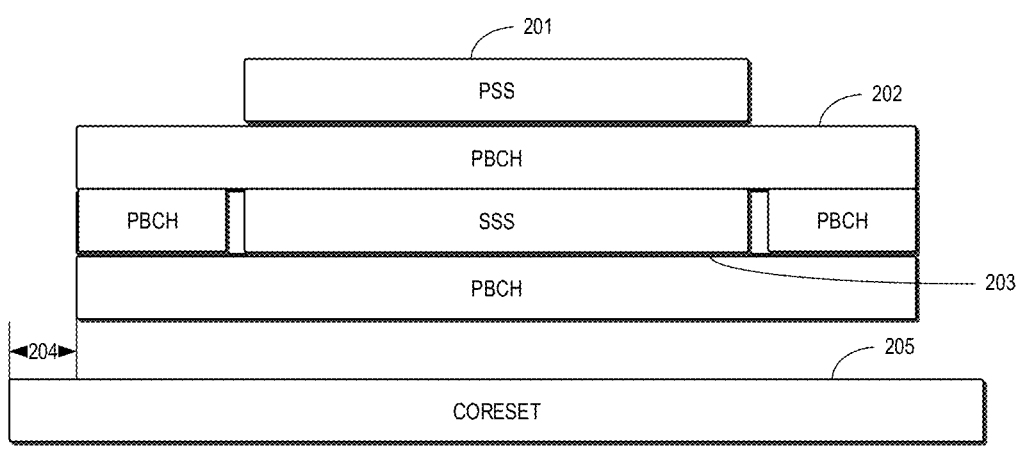
FIG. 2 illustrates an example of CORESET #0 frequency domain resource allocation according to some example embodiments of the present disclosure.

First, the CORESET #0 frequency domain location can be considered with respect to SSB. FIG. 2 shows an example of CORESET #0 frequency domain resource allocation.

As shown in FIG. 2, after the UE has detected Primary synchronization signal (PSS) 201 and Secondary synchronization signal (SSS) 203 and demodulated the PBCH 202, the UE has acquired the Master Information Block (MIB) on the PBCH 202. Next the UE needs to acquire the remaining minimum system information, carried by the SIB1. The UE reads the CORESET #0 configuration index from the MIB on the PBCH 202, which indicates time and frequency resource allocation parameters for the CORESET 205. One of the parameters defines the frequency domain offset 204 between the first RB in which the SSB is located and the first RB of CORESET #0.

Similar to the PBCH transmission, puncturing may be needed to constrain CORESET #0 within the available spectrum. This may lead to situations where the constrained CORESET #0 would contain some partial CCEs. For example, when the available spectrum is not an integer multiple of CCE size and is less than 24 RBs (for our specific case: 20 RBs), there would be at least one partial CCE.

However, if the puncturing of PBCH is not taken into account on the CORESET #0 frequency domain allocation, there would be unnecessarily two CCEs that are punctured. As a CCE is used as the basic resource unit in channel estimation, partial CCEs can degrade channel estimation.

Although the use of partial CCEs is unavoidable, it makes sense to minimize the number of partial CCEs. Thus, the CORESET #0 frequency domain allocation may require re-consideration to keep CORESET #0 aligned at the CCE level with the non-punctured RBs of the SSB or in case of 20 RBs to keep the unpunctured part of the CORESET #0 aligned at the CCE level with RBs of the SSB.

In this situation, how to configure a narrower bandwidth for CORESET #0 (especially for Type0_PDCCH) with 20RB CORESET #0 design when operating with 5 MHz channel bandwidth (targeting especially band n100) may need to be further discussed to minimize the additional complexity, while provide the sufficient flexibility.

According to some example embodiments of the present disclosure, there is provided a solution for controlling the CORESET #0 puncturing. In this solution, the first apparatus 110 detects a synchronization signal block, received from a second apparatus, on a specific frequency location and determine whether a CORESET of a specific type is punctured based on the detection. If the first apparatus 110 determines that the CORESET of the specific type is punctured, the first apparatus 110 determines the portion of resources punctured in the CORESET at least based on the CORESET puncturing pattern.

Based on the solution, a flexible selection between punctured vs. non-punctured CORESET #0 and corresponding puncturing options can be supported.

Example embodiments of the present disclosure will be described in detail below with reference to the accompanying drawings.

Figure 3:
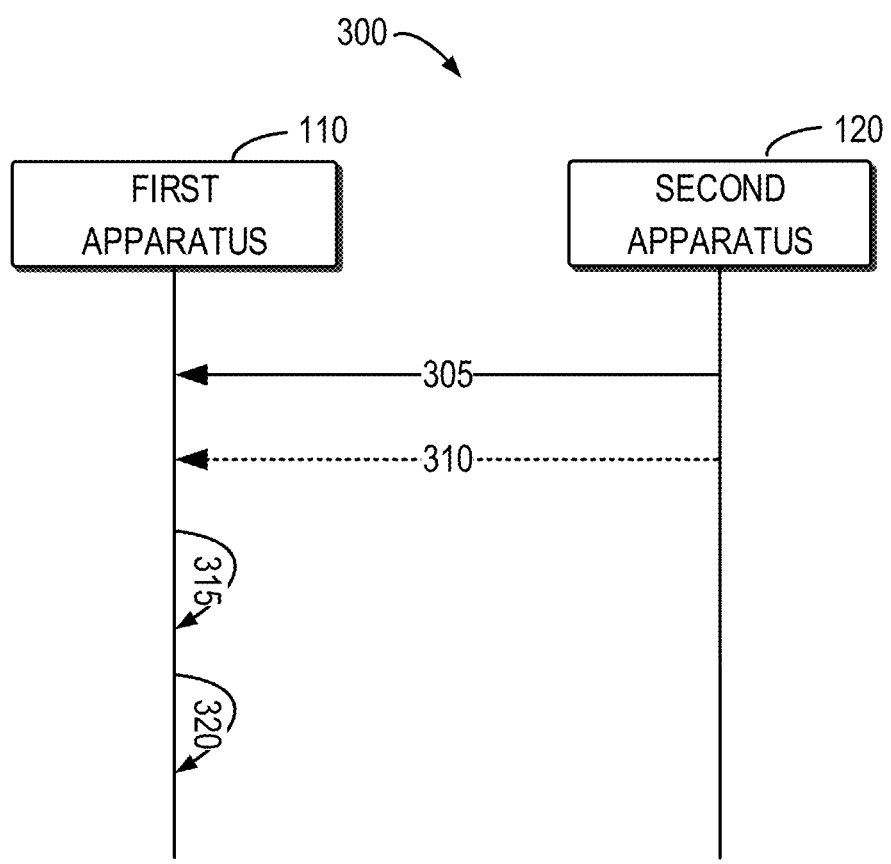
FIG. 3 illustrates a signaling chart 300 for communication according to some example embodiments of the present disclosure.

Reference is now made to FIG. 3, which shows a signaling chart 300 for communication according to some example embodiments of the present disclosure. As shown in FIG. 3, the signaling chart 300 involves the first apparatus 110 and the second apparatus 120. For the purpose of discussion, reference is made to FIG. 1 to describe the signaling chart 300. It is to be understood that the process shown in FIG. 3 may also be adopted by other terminal devices and network devices shown in FIG. 1.

The first apparatus 110 may perform an initial access to a channel associated with a specific bandwidth (e.g., n100, 5 MHz channel bandwidth (CBW)). As shown in FIG. 1, the second apparatus 120 may transmit (305) an SSB. It is to be understood that the SSB used herein may include a 'Synchronization Signal' (SS) block and a PBCH block, and the SS block may be replaced by a synchronization signal, a primary synchronization signal, or a secondary synchronization signal.

Based on the detection of the SSB, the first apparatus 110 determines CORESET #0 parameters such as CORESET multiplexing pattern, number of RBs, number of symbols, the offset (RBs) from table 1, entries 0-5.

TABLE 1 set of resource blocks and slots symbols of CORESET for Type0-PDCCH search space set when {SS/PBCH block, PDCCH} SCS is {15, 15} kHz for frequency bands with minimum channel bandwidth 5 MHz or 10 MHz or with minimum channel bandwidth 3 MHz and channel bandwidth larger than 3 MHz

| index | SS/PBCH block and CORESET multiplexing pattern | number of RBs $N_{RB}^{CORESET}$ | number of symbols $N_{symb}^{CORESET}$ | offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | | reserved | | |

If the first apparatus 110 detects the SSB on a specific frequency location, the first apparatus 110 may determine (315) that a CORESET of a specific type is punctured. The term "a CORESET of a specific type" used herein may be referred to as CORESET #0 that are used e.g., for the PDCCH that schedules the transmission of SIB1, known as Type0-PDCCH.

The term "specific frequency location" used herein may be referred to as a location of a sync raster point in a frequency domain such as, e.g., 921.45 MHz. This sync raster point could be set based on n100 lower band edge which is at 919.4 MHz. This means that the lowest channel raster point having the channel BW within the band is at 919.4 MHz+2.5 MHz=921.9 MHz. 5 MHz CBW means 25 RBs so lowest RB edge is 12.5 RBs below channel raster point. The sync raster point with the lowest RB aligned with the lowest RB of the channel (common raster) is then 12.5−10=2.5 RB (=450 kHz) below the channel raster point, i.e. 921.9−0.45=921.45 MHz. So in short, the 921.45 is the sync raster point that allows SSB to be placed as low as possible within the band with 5 MHz CBW but limited to 20 PRB transmission bandwidth. It is also a sync raster point that is not part of regular/legacy sync raster otherwise used for 5 MHz CBW with the regular 25 PRB transmission bandwidth on n100.

For example, if the first apparatus 110 determines that a primary synchronization signal or a secondary synchronization signal is detected on the specific frequency location, the first apparatus 110 may determine that a CORESET of a specific type is punctured.

The CORESET #0 is operated without puncturing with the remaining synch raster points for 5 MHz CBW.

Furthermore, an additional confirmation for a CORESET puncturing may be obtained by the first apparatus from another way, such as from MIB.

Various puncturing patterns may be obtained/determined by the first apparatus 110. For example, the puncturing patterns may be configured by the second apparatus 120 and transmitted to the first apparatus 110 or pre-configured/pre-defined in the specification.

After determining that a CORESET of a specific type is punctured, the first apparatus 110 may determine the corresponding puncturing pattern for the CORESET puncturing. Various puncturing patterns are described in detail with respective to FIGS. 4A-4F as below.

As an option (hereinafter may be referred as to option 1), RBs below the lowest RB of PBCH (i.e., RB #0) are punctured. In some embodiment, the lowest subcarrier of PBCH (i.e., RB #0) can be seen as puncturing_threshold-_low.

Figure 4A:
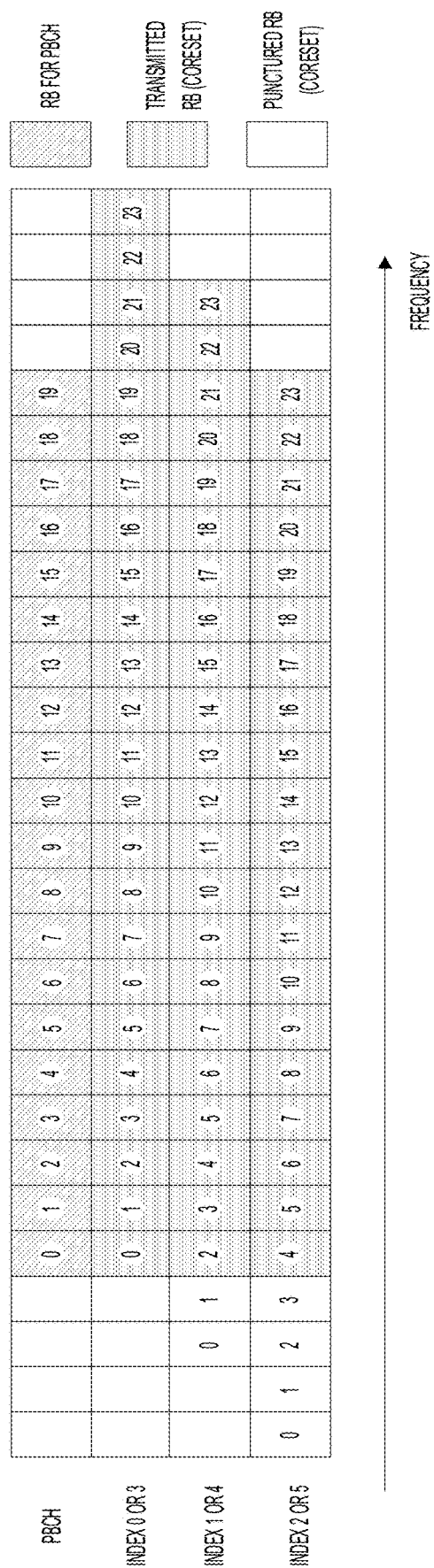
FIG. 4A-4F illustrates examples of CORESET puncturing according to some example embodiments of the present disclosure.

FIG. 4A shows an example of CORESET puncturing when using the MIB informed Table 1 according to some example embodiments of the present disclosure. As shown, for index 0 or 3, index 1 or 4 and index 2 or 5 of Table 1 RBs below the RB #0 of PBCH are to be punctured.

In another option (hereinafter may be referred as to option 2), RBs above the highest RB of PBCH (i.e., RB #19) are punctured. In some embodiment, the highest subcarrier of PBCH (i.e., RB #19) can be seen as puncturing_threshold-_high.

In a further option (hereinafter may be referred as to option 3), RBs below the lowest RB of PBCH (i.e., RB #0) and above the highest RB of PBCH (i.e., RB #19) are punctured to align the transmission bandwidth with PBCH.

Figure 4B:
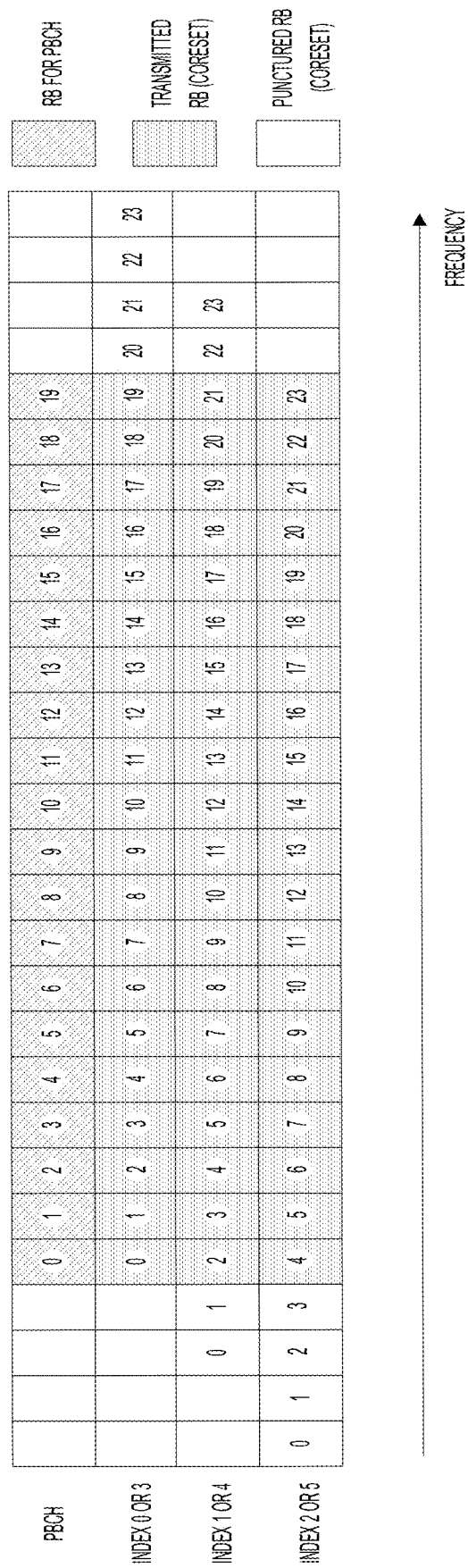

FIG. 4B shows an example of CORESET puncturing when using the MIB informed Table 1 according to some example embodiments of the present disclosure. As shown on the basis of option 3, for index 0 or 3, index 1 or 4 and index 2 or 5 of Table 1 RBs below the RB #0 and above the RB #19 of PBCH are to be punctured.

Furthermore, on the basis of options 1-3 as described above, only those indexes that contain up-to 20RBs after puncturing operation may be considered as valid indexes. The first apparatus 110 may also not expect to receive an invalid index. Additionally or optionally, puncturing is additionally applied with a granularity of full a CCE (rather than RB). In other words, if at least one RB of a CCE needs to be punctured, the whole CCE (i.e., all RBs part of that CCE) will be punctured (hereinafter may be referred as to option 4). In this option the non-punctured resources comprise an integer multiple of 6 REGs.

Figure 4C:
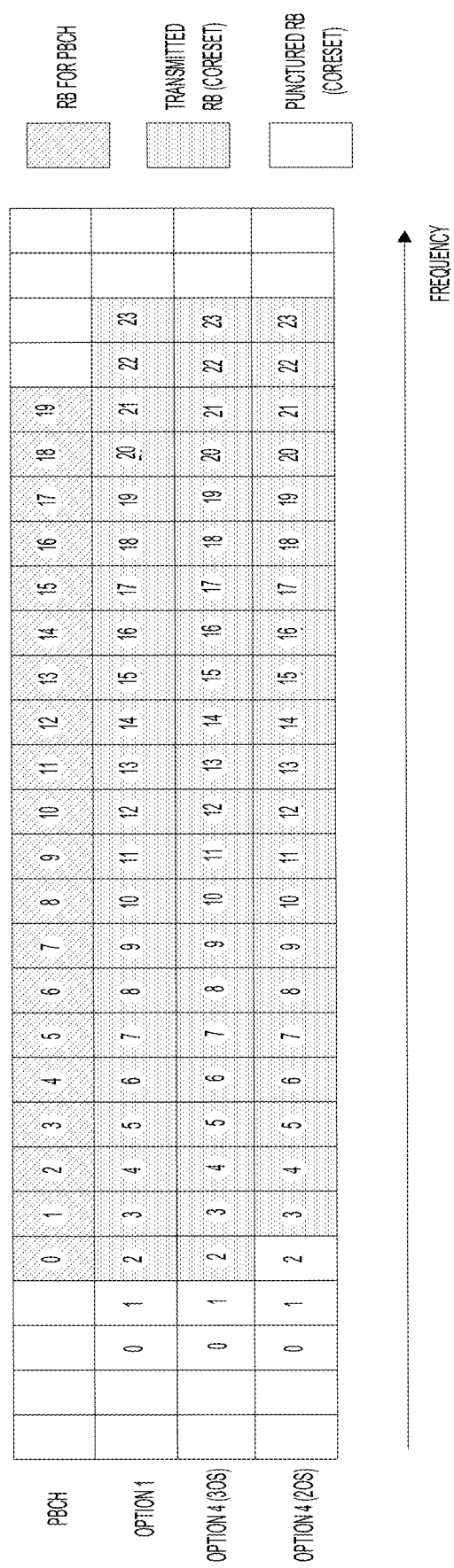

FIG. 4C shows an example of CORESET puncturing when using the MIB informed Table 1 according to some example embodiments of the present disclosure. On the basis of option 1, i.e., RBs below the lowest RB of PBCH (i.e., RB #0) are punctured, FIG. 4C shows a puncturing pattern (index 1 or 4) according to option 4 with only full CCEs transmitted. In FIG. 4C, option 1 pattern is shown as reference (index 1 or 4) for the option 4 patterns (one is for index 4 with 3 OFDM symbols (OS) and the other is for index 1 with 2 OS shown below the option 1 pattern) that are derived from the option 1 pattern.

Figure 4D:
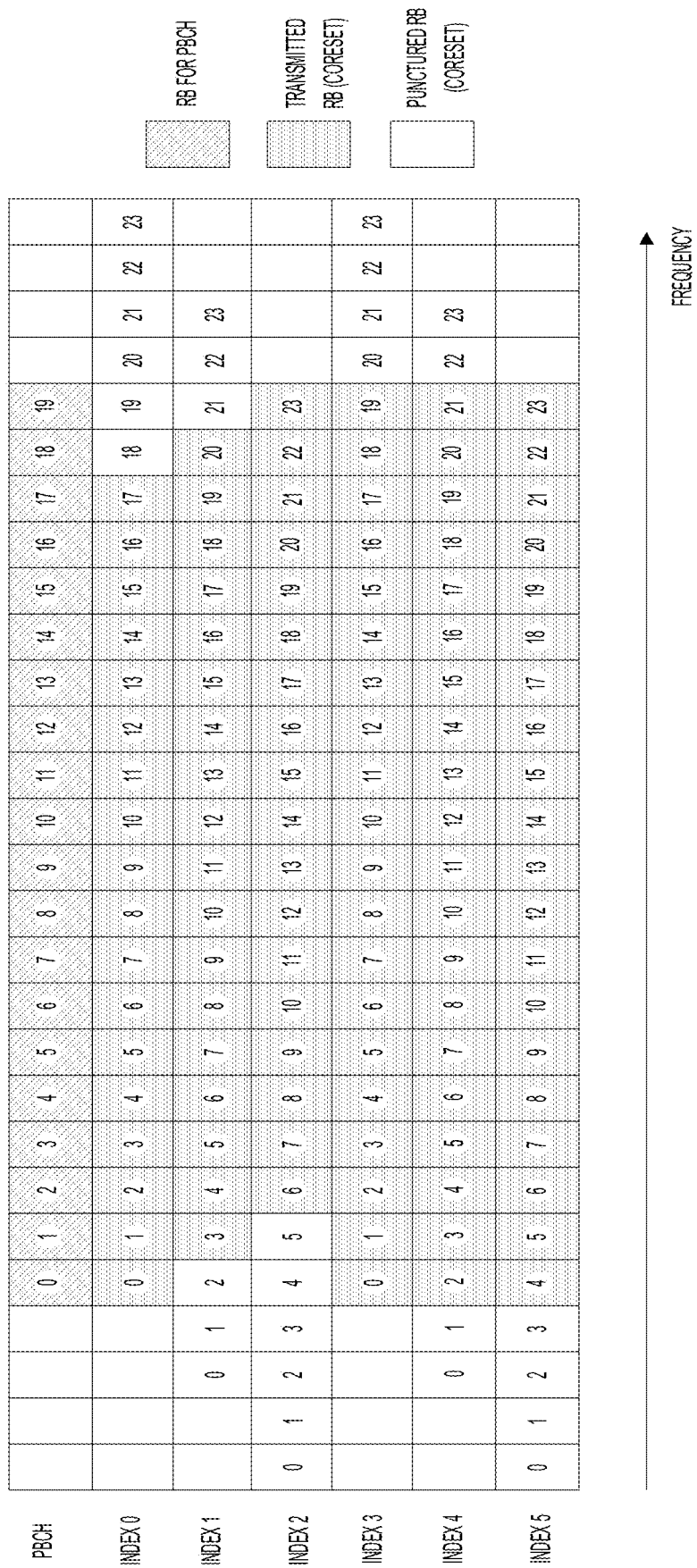

FIG. 4D shows an example of CORESET puncturing when using the MIB informed Table 1 according to some example embodiments of the present disclosure. On the basis of option 3, i.e., both RBs below the lowest RB of PBCH (i.e., RB #0) and above the highest RB of PBCH (i.e., RB #19) are punctured, FIG. 4D shows a puncturing pattern (for indices 0-5 of Table 1) according to option 4 with only full CCEs transmitted.

In some variants, there is a threshold of a share of the RBs of a CCE based on which it's determined whether the whole CCE will be punctured. For example, if the threshold is 0.5 (50%) the whole CCE is punctured if at least half of the RBs of the CCE needs to be punctured.

Figure 4E:
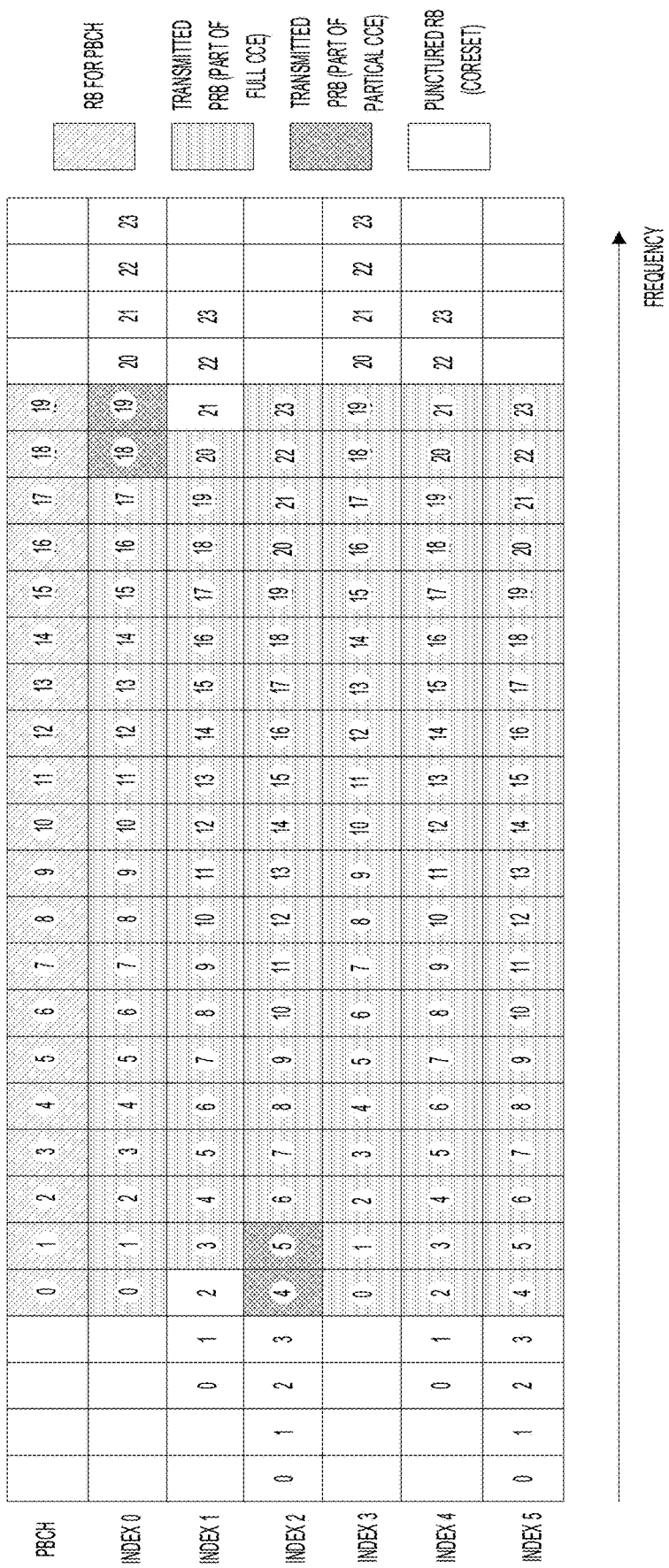

FIG. 4E shows an example of CORESET puncturing when using the MIB informed Table 1 according to some example embodiments of the present disclosure. On the basis of option 3, i.e., both RBs below the lowest RB of PBCH (i.e., RB #0) and above the highest RB of PBCH (i.e., RB #19) are punctured, FIG. 4E shows a puncturing pattern according to option 4, i.e., only PRBs transmitted in case of more than 50% of PRBs of a CCE.

Furthermore, on the basis of options 1-4 as described above, the IEs puncturing_threshold_low and/or puncturing_threshold_high may be determined with a predefined offset with respect to the lowest RB of PBCH (i.e., RB #0) and the highest RB of PBCH (i.e., RB #19) (hereinafter may be referred as to option 5).

In some embodiments, the predefined offset is [offset_low, offset_high]=[x,y] subcarriers (x, y are positive or negative integers). In some other embodiments, the predefined offset is [offset_low, offset_high]=[x,y] RBs (x,y are positive or negative integers).

In a further option, assuming that CORESET #0 and PBCH are in subcarrier offset with respect to each other. This option (hereinafter may be referred as to option 6) is a variant of options 1-3, where puncturing is applied with the granularity of subcarrier. In this case, partial RB (for CORESET #0) is considered to be a punctured RB. The partial RB may be considered as a portion of symbols or subcarriers in an RB (hereinafter may be referred as to option 6). A partial RB can be called also a punctured RB, where a partial RB has punctured subcarriers and the number of punctured subcarriers of the partial RB is greater than 0 and less than 12.

Moreover, on the basis of options 1-5 as described above, puncturing may require additional implicit or explicit signaling or confirmation (otherwise UE interprets error in MIB content and continues searching other PSS/SSSs or, alternatively UE does not apply puncturing without additional confirmation). The additional confirmation can be e.g., certain value in k_SSB (an indicated gap between Subcarrier 0 of SS/PBCH block and Common Resource Block), e.g., 0 or a k_SSB value that is predefined to correspond to the indicated CORESET table index (hereinafter may be referred as to option 7). The k_SSB may indicate the frequency domain offset between SSB and the common resource block in number of subcarriers. k_SSB is indicated by the MIB.

In another option, certain indexes (e.g., Index 0 and/or Index 3) are considered as the only valid options for the cases when the detected synch raster point relates to n100, 5 MHz CBW (hereinafter may be referred as to option 8).

Figure 4F:
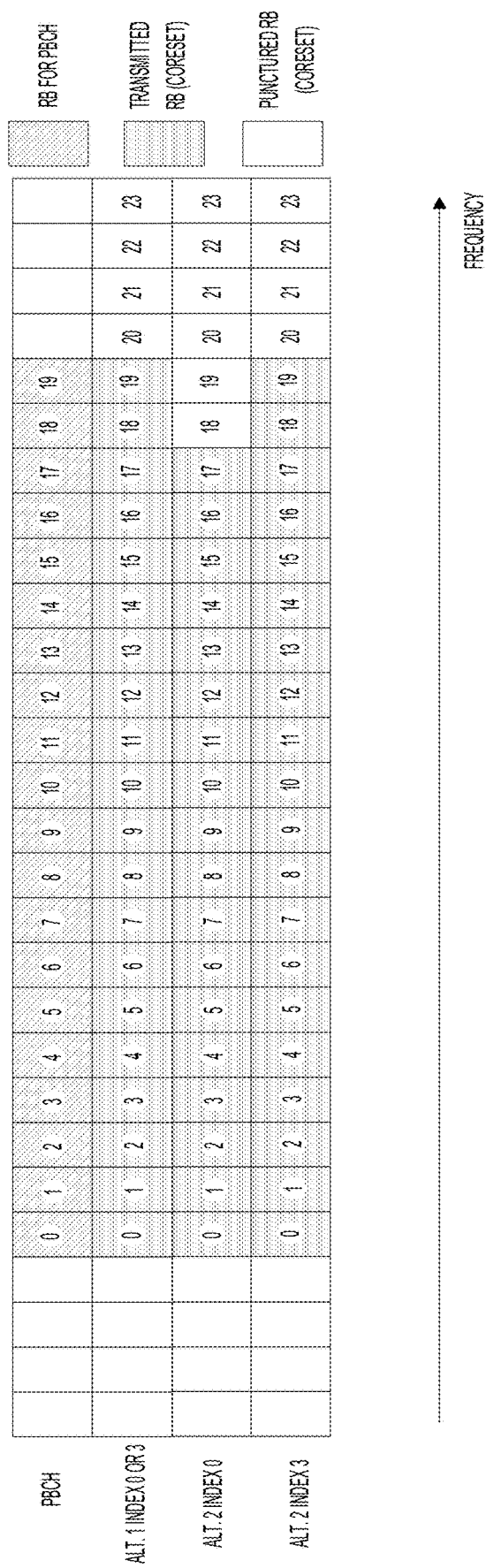

FIG. 4F an example of CORESET puncturing when using the MIB informed Table 1 according to some example embodiments of the present disclosure. As shown on the basis of option 8, in a case where one predefined synch raster point is 921.45 MHz, in some embodiments, for index 0 or index 3, RBs 20-23 are punctured (Alt. 1). In some other embodiments denoted with Alt. 2, RBs 18-23 are punctured for index 0 (with 20S CORESET) and RBs 20-23 are punctured for index 3 (with 30S CORESET), hence, limiting puncturing to the granularity of whole CCEs.

As described above, with the CORESET puncturing pattern, the first apparatus 110 may determine the portion of resources punctured in the CORESET. Now the reference is back to FIG. 3, the first apparatus 110 may decode (320) the PBCH and monitor the PDCCH based on the determined portion of resources punctured in the CORESET.

In another case where PSS/SSS is found from another synch raster point defined for 5 MHz CBW on the specific channel and the CORESET is determined as not being punctured, the first apparatus 110 may decode the PBCH and obtain information from PBCH/MIB to determine Index addressing a row (0-5) in Table 1. Then the first apparatus 110 may perform detection for Type0_PDCCH assuming that reception does not involve puncturing.

In this way, the original Table for CORESET #0 (i.e., Table 1) can be reused. Furthermore, a flexible selection between punctured vs. non-punctured CORESET #0 and corresponding puncturing options can be supported.

Figure 5:
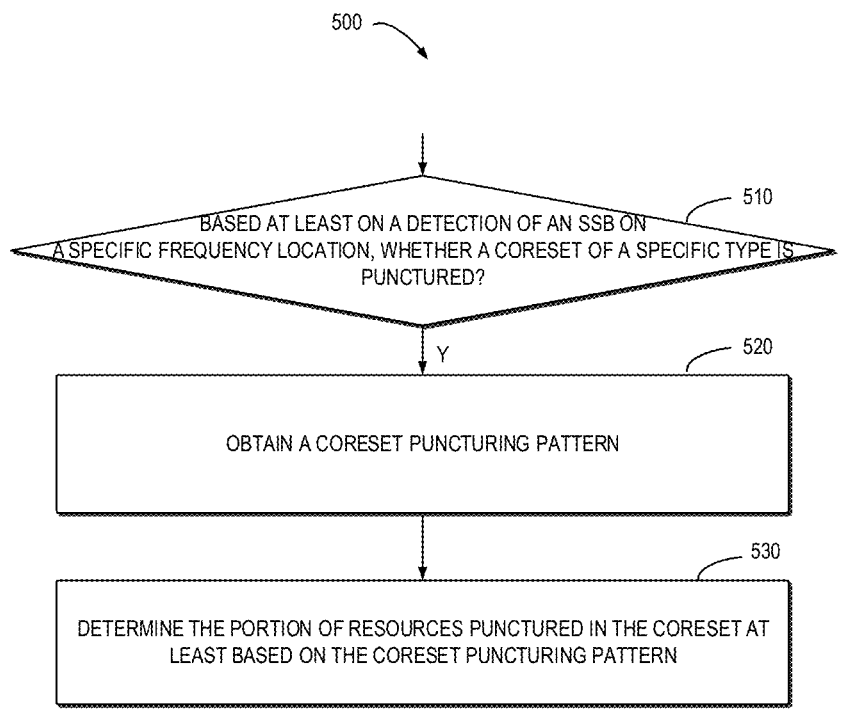
FIG. 5 illustrates a flowchart of an example method 500 of CORESET #0 puncturing controlling according to some example embodiments of the present disclosure.

FIG. 5 shows a flowchart of an example method 500 of CORESET #0 puncturing controlling according to some example embodiments of the present disclosure. The method 500 may be implemented at the first apparatus 110 (which may be implemented as a terminal device) as shown in FIG. 1. For the purpose of discussion, the method 500 will be described with reference to FIG. 1.

At block 510, the first apparatus 110 determines, based at least on a detection of a synchronization signal block, received from a second apparatus, on a specific frequency location, whether a CORESET of a specific type is punctured, wherein a portion of resources punctured in the CORESET of the specific type are incapable of carrying downlink control information.

If the first apparatus 110 determines the CORESET of the specific type is punctured, at block 520, the first apparatus 110 obtains a CORESET puncturing pattern.

At block 530, the first apparatus 110 determines the portion of resources punctured in the CORESET at least based on the CORESET puncturing pattern.

In some example embodiments, the CORESET of the specific type is CORESET #0.

In some example embodiments, the method 500 further comprises: in accordance with a determination that at least one of the following: a primary synchronization signal or a secondary synchronization signal is detected on the specific frequency location, or additional confirmation for a CORESET puncturing is obtained from a master information block, determining that the CORESET of the specific type is punctured.

In some example embodiments, the specific frequency location is associated with a location of a sync raster point in a frequency domain.

In some example embodiments, the obtaining of the CORESET puncturing pattern comprises: determining of at least one puncturing threshold associated with a location of a set of broadcasting channel resource blocks; in accordance with a determination that the portion of resources in the CORESET do not satisfy the at least one puncturing threshold, determining that the portion of resources are punctured.

In some example embodiments, the portion of resources in the CORESET do not satisfy the at least one puncturing threshold comprises at least one of the following: one or more resource blocks of the CORESET are located below the lowest broadcasting channel resource block; or one or more resource blocks of the CORESET are located above the highest broadcasting channel resource block.

In some example embodiments, the at least one puncturing threshold is determined based on an offset with respect to at least one of: a lowest broadcasting channel resource block, or a highest broadcasting channel resource block.

In some example embodiments, the method 500 further comprises: in accordance with a determination that the puncturing threshold is determined based on an offset with respect the location of the set of broadcasting channel resource blocks and the offset has a granularity of subcarrier, determine that the portion of resources punctured in the CORESET comprises at least one partial resource block.

In some example embodiments, the method 500 further comprises: in accordance with a determination that the CORESET puncturing pattern requires that the CORESET is punctured with a granularity of a control channel element, CCE, and at least one resource block in the CCE is punctured, determining that a second portion of further resource blocks in the CCE is punctured.

In some example embodiments, whether the further resource blocks in the CCE are punctured is determined based on a threshold value.

In some example embodiments, the method 500 further comprises: in accordance with a determination that the sync raster point relates to at least one of the following: a specific bandwidth, or a specific band, determining that only at least one specific index associated with the CORESET of the specific type is valid; and determining that one or more specific resource blocks associated with the at least one specific index are punctured, wherein the at least one specific index is indicated by a master information block.

In some example embodiments, the method 500 further comprises: determining that the at least one specific index associated with the CORESET of the specific type is valid when the related CORESET contains up-to 20RBs after puncturing operation.

In some example embodiments, the first apparatus comprises a terminal device and the second apparatus comprises a network device.

Figure 6:
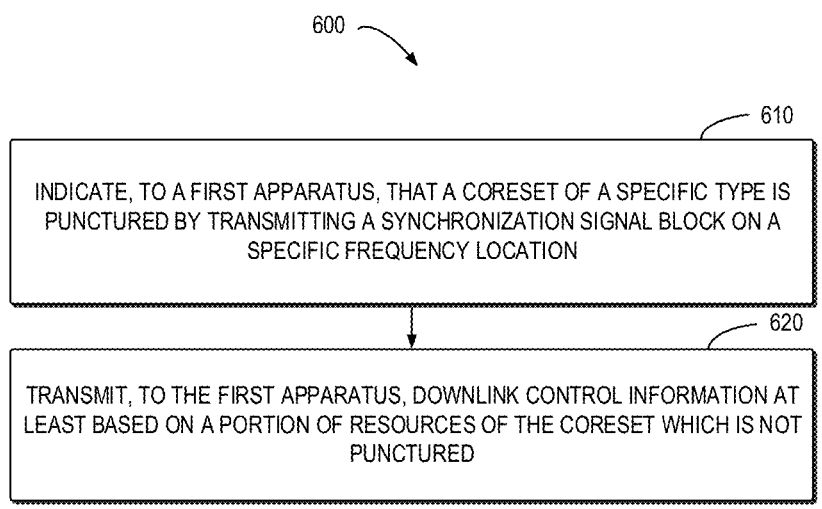
FIG. 6 illustrates a flowchart of an example method 600 of CORESET #0 puncturing controlling according to some example embodiments of the present disclosure.

FIG. 6 shows a flowchart of an example method 600 of CORESET puncturing controlling according to some example embodiments of the present disclosure. The method 600 may be implemented at the second apparatus 120 (which may be implemented as a network device) as shown in FIG. 1. For the purpose of discussion, the method 600 with be described with reference to FIG. 1.

At block 610, indicating, to a first apparatus, that a CORESET of a specific type is punctured by transmitting a synchronization signal block on a specific frequency location; and At block 620, transmitting, to the first apparatus, downlink control information at least based on a portion of resources of the CORESET which is not punctured.

In some example embodiments, the CORESET of the specific type is CORESET #0.

In some example embodiments, the apparatus is caused to indicating that the CORESET of the specific type is punctured by additional information in a master information block.

In some example embodiments, the specific frequency location is associated with a location of a sync raster point in a frequency domain.

In some example embodiments, the first apparatus comprises a terminal device and the second apparatus comprises a network device.

In some example embodiments, a first apparatus capable of performing any of the method 500 (for example, the first apparatus 110 in FIG. 1) may comprise means for performing the respective operations of the method 500. The means may be implemented in any suitable form. For example, the means may be implemented in a circuitry or software module. The first apparatus may be implemented as or included in the first apparatus 110.

In some example embodiments, the first apparatus comprises means for determining, based at least on a detection of a synchronization signal block, received from a second apparatus, on a specific frequency location, whether a CORESET of a specific type is punctured, wherein a portion of resources punctured in the CORESET of the specific type are incapable of carrying downlink control information; means for, in accordance with a determination that the CORESET of the specific type is punctured, obtaining a CORESET puncturing pattern; and means for determining the portion of resources punctured in the CORESET at least based on the CORESET puncturing pattern.

In some example embodiments, the CORESET of the specific type is CORESET #0.

In some example embodiments, the first apparatus further comprises: means for in accordance with a determination that at least one of the following: a primary synchronization signal or a secondary synchronization signal is detected on the specific frequency location, or additional confirmation for a CORESET puncturing is obtained from a master information block, determining that the CORESET of the specific type is punctured.

In some example embodiments, the specific frequency location is associated with a location of a sync raster point in a frequency domain.

In some example embodiments, the means for obtaining of the CORESET puncturing pattern comprises: means for determining of at least one puncturing threshold associated with a location of a set of broadcasting channel resource blocks; means for in accordance with a determination that the portion of resources in the CORESET do not satisfy the at least one puncturing threshold, determining that the portion of resources are punctured.

In some example embodiments, the portion of resources in the CORESET do not satisfy the at least one puncturing threshold comprises at least one of the following: one or more resource blocks of the CORESET are located below the lowest broadcasting channel resource block; or one or more resource blocks of the CORESET are located above the highest broadcasting channel resource block.

In some example embodiments, the at least one puncturing threshold is determined based on an offset with respect to at least one of: a lowest broadcasting channel resource block, or a highest broadcasting channel resource block.

In some example embodiments, the first apparatus further comprises: means for in accordance with a determination that the puncturing threshold is determined based on an offset with respect the location of the set of broadcasting channel resource blocks and the offset has a granularity of subcarrier, determine that the portion of resources punctured in the CORESET comprises at least one partial resource block.

In some example embodiments, the first apparatus further comprises: means for in accordance with a determination that the CORESET puncturing pattern requires that the CORESET is punctured with a granularity of a control channel element, CCE, and at least one resource block in the CCE is punctured, determining that a second portion of further resource blocks in the CCE is punctured.

In some example embodiments, whether the further resource blocks in the CCE are punctured is determined based on a threshold value.

In some example embodiments, the first apparatus further comprises: means for in accordance with a determination that the sync raster point relates to at least one of the following: a specific bandwidth, or a specific band, determining that only at least one specific index associated with the CORESET of the specific type is valid; and means for determining that one or more specific resource blocks associated with the at least one specific index are punctured, wherein the at least one specific index is indicated by a master information block.

In some example embodiments, the first apparatus further comprises: means for determining that the at least one specific index associated with the CORESET of the specific type is valid when the related CORESET contains up-to 20RBs after puncturing operation.

In some example embodiments, the first apparatus comprises a terminal device and the second apparatus comprises a network device.

In some example embodiments, the first apparatus further comprises means for performing other operations in some example embodiments of the method 500 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 600 (for example, the second apparatus 120 in FIG. 1) may comprise means for performing the respective operations of the method 600. The means may be implemented in any suitable form. For example, the means may be implemented in a circuitry or software module. The second apparatus may be implemented as or included in the second apparatus 120 in FIG. 1.

In some example embodiments, the second apparatus comprises means for indicating, to a first apparatus, that a CORESET of a specific type is punctured by transmitting a synchronization signal block on a specific frequency location; and means for transmitting, to the first apparatus, downlink control information at least based on a portion of resources of the CORESET which is not punctured.

In some example embodiments, the CORESET of the specific type is CORESET #0.

In some example embodiments, the second apparatus further comprises means for indicating that the CORESET of the specific type is punctured by additional information in a master information block.

In some example embodiments, the specific frequency location is associated with a location of a sync raster point in a frequency domain.

In some example embodiments, the first apparatus comprises a terminal device and the second apparatus comprises a network device.

In some example embodiments, the second apparatus further comprises means for performing other operations in some example embodiments of the method 600 or the second apparatus 120. In some example embodiments, the means comprises at least one processor; and at least one memory storing instructions that, when executed by the at least one processor, cause the performance of the second apparatus.

Figure 7:
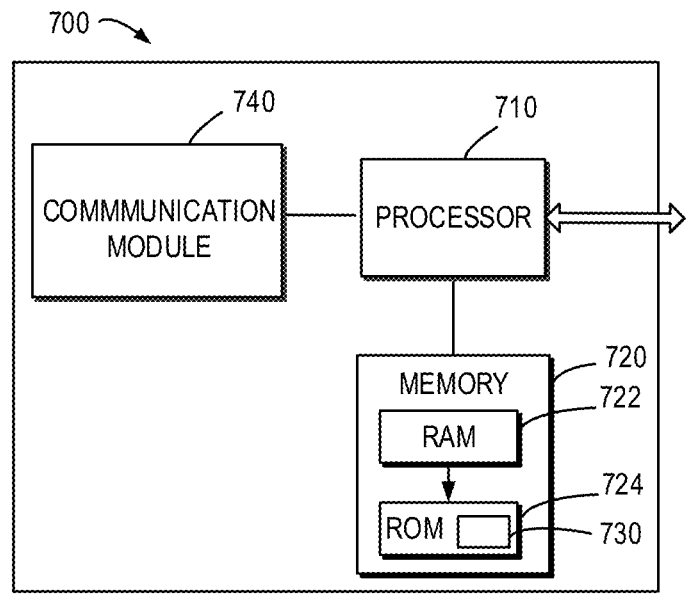
FIG. 7 illustrates a simplified block diagram of a device 700 that is suitable for implementing example embodiments of the present disclosure.

FIG. 7 is a simplified block diagram of a device 700 that is suitable for implementing example embodiments of the present disclosure. The device 700 may be provided to implement a communication device, for example, the first apparatus 110 or the second apparatus 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 8:
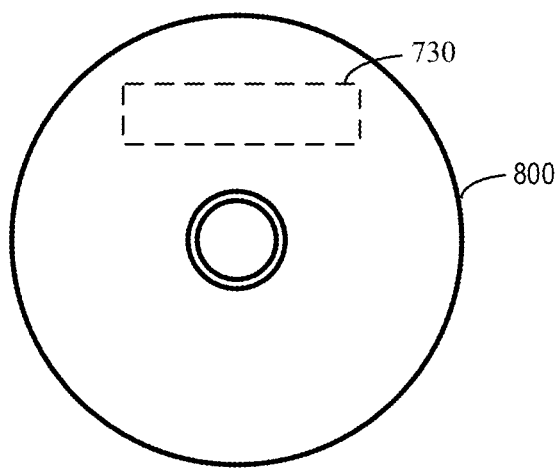
FIG. 8 illustrates a block diagram of an example computer readable medium in accordance with some example embodiments of the present disclosure.

FIG. 8 shows an example of the computer readable medium 800 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, comprising:
    at least one processor; and
    at least one memory storing instructions that, when executed by the at least one processor, cause the first apparatus at least to:
        determine that a primary synchronization signal or a secondary synchronization signal is detected on a specific frequency location;
        detect a synchronization signal block received from a second apparatus is on the specific frequency location;
        based on the detection of the synchronization signal block on the specific frequency location, determine, whether a control resource set (CORESET) of a specific type is punctured, wherein the specific frequency location is 921.45 MHz which is only applicable for a 20 physical resource block (PRB) transmission bandwidth configuration within a channel bandwidth of 5 MHz, wherein a portion of resources punctured in the CORESET of the specific type is incapable of carrying downlink control information;
        in accordance with a determination that the CORESET of the specific type is punctured, obtain a CORESET puncturing pattern, wherein the CORESET puncturing pattern is obtained by puncturing the 4 highest-numbered resource blocks to form a narrower bandwidth of the CORESET;
        determine the portion of resources punctured in the CORESET at least based on the CORESET puncturing pattern;
        monitor a physical downlink control channel (PDCCH) carrying downlink control information based on a portion of resources of the CORESET which is not punctured according to the CORESET puncturing pattern,
        wherein the portion of resources of the CORESET comprises a number of consecutive resource blocks and a number of consecutive symbols; and
        obtain additional confirmation for a CORESET puncturing from a master information block, where the additional confirmation indicates the CORESET of the specific type is punctured.

2. The first apparatus of claim 1, wherein the CORESET of the specific type is CORESET #0.

3. The first apparatus of claim 1, wherein the obtaining of the CORESET puncturing pattern comprises:
    determining of at least one puncturing threshold associated with a location of a set of broadcasting channel resource blocks;

in accordance with a determination that the portion of resources in the CORESET do not satisfy the at least one puncturing threshold, determine that the portion of resources are punctured.

4. The first apparatus of claim 3, wherein the portion of resources in the CORESET do not satisfy the at least one puncturing threshold comprises at least one of the following:
one or more resource blocks of the CORESET are located below the lowest broadcasting channel resource block; or
one or more resource blocks of the CORESET are located above the highest broadcasting channel resource block.

5. The first apparatus of claim 3, wherein the at least one puncturing threshold is determined based on an offset with respect to at least one of:
a lowest broadcasting channel resource block, or
a highest broadcasting channel resource block.

6. The first apparatus of claim 5, wherein the at least one memory storing the instructions, when executed by the at least one processor, further cause the first apparatus at least to:
in accordance with a determination that the puncturing threshold is determined based on an offset with respect the location of the set of broadcasting channel resource blocks and the offset has a granularity of subcarrier, determine that the portion of resources punctured in the CORESET comprises at least one partial resource block.

7. The first apparatus of claim 1, wherein the at least one memory storing the instructions, when executed by the at least one processor, further cause the first apparatus at least to:
in accordance with a determination that the CORESET puncturing pattern requires that the CORESET is punctured with a granularity of a control channel element, CCE, and at least one resource block in the CCE is punctured, determine that a second portion of further resource blocks in the CCE is punctured.

8. The first apparatus of claim 7, wherein whether the further resource blocks in the CCE are punctured is determined based on a threshold value.

9. The first apparatus of claim 1, wherein the specific frequency location is associated with a location of a sync raster point in a frequency domain.

10. The first apparatus of claim 9, wherein the at least one memory storing the instructions, when executed by the at least one processor, further cause the first apparatus at least to:
in accordance with a determination that the sync raster point relates to at least one of the following:
a specific bandwidth, or
a specific band, determine that only at least one specific index associated with the CORESET of the specific type is valid; and
determine that one or more specific resource blocks associated with the at least one specific index are punctured, wherein the at least one specific index is indicated by a master information block.

11. The first apparatus of claim 10, wherein the at least one memory storing the instructions, when executed by the at least one processor, further cause the first apparatus at least to:
determine that the at least one specific index associated with the CORESET of the specific type is valid when the related CORESET contains up-to 20RBs after a puncturing operation.

12. The first apparatus of claim 1, wherein the first apparatus comprises a terminal device and the second apparatus comprises a network device.

13. A second apparatus, comprising:
at least one processor; and
at least one memory storing instructions that, when executed by the at least one processor, cause the second apparatus at least to:
transmit, to a first apparatus, a synchronization signal block on a specific frequency location,
by the transmission of the synchronization signal block on the specific frequency location, indicate, to the first apparatus, whether a control resource set (CORESET) of a specific type is punctured, wherein the specific frequency location is 921.45 MHz which is only applicable for a 20 physical resource block (PRB) transmission bandwidth configuration within a channel bandwidth of 5 MHZ,
wherein a portion of resources punctured in the CORESET of the specific type is incapable of carrying downlink control information;
transmit, to the first apparatus, a CORESET puncturing pattern, wherein the CORESET puncturing pattern is obtained to have the 4 highest-numbered resource blocks punctured to form a narrower bandwidth of the CORESET;
transmit, to the first apparatus, downlink control information at least based on a portion of resources of the CORESET which is not punctured, wherein the portion of resources of the CORESET comprises a number of consecutive resource blocks and a number of consecutive symbols,
wherein the synchronization signal block comprises a primary synchronization signal or a secondary synchronization signal transmitted on the specific frequency location; and
indicate the CORESET of the specific type is punctured by additional information in a master information block.

14. The second apparatus of claim 13, wherein the CORESET of the specific type is CORESET #0.

15. The second apparatus of claim 13, wherein the specific frequency location is associated with a location of a sync raster point in a frequency domain.

16. The second apparatus of claim 13, wherein the first apparatus comprises a terminal device and the second apparatus comprises a network device.

17. A method, comprising:
determining that a primary synchronization signal or a secondary synchronization signal is detected on a specific frequency location;
detecting a synchronization signal block received from a second apparatus is on the specific frequency location;
based on the detection of the synchronization signal block on the specific frequency location, determining, whether a control resource set (CORESET) of a specific type is punctured, wherein the specific frequency location is 921.45 MHz which is only applicable for 20 physical resource block (PRB) transmission bandwidth configuration within a channel bandwidth of 5 MHz, wherein a portion of resources punctured in the CORESET of the specific type is incapable of carrying downlink control information;
in accordance with a determination that the CORESET of the specific type is punctured, obtaining a CORESET puncturing pattern, wherein the CORESET puncturing pattern is obtained by puncturing the 4 highest-numbered of resource blocks to form a narrower bandwidth of the CORESET;

determining the portion of resources punctured in the CORESET at least based on the CORESET puncturing pattern;

monitoring a physical downlink control channel (PDCCH) carrying downlink control information based on a portion of resources of the CORESET which is not punctured according to the CORESET puncturing pattern, wherein the portion of resources of the CORESET comprises a number of consecutive resource blocks and a number of consecutive symbols; and obtaining additional confirmation for a CORESET puncturing from a master information block, where the additional confirmation indicates the CORESET of the specific type is punctured.

18. The method of claim 17, further comprising:

in accordance with determining of at least one of:
- a primary synchronization signal or a secondary synchronization signal is detected on the specific frequency location, or additional confirmation for a CORESET puncturing is obtained from a master information block, determining that the CORESET of the specific type is punctured.

\* \* \* \* \*